US008654089B2

(12) United States Patent
Chou et al.

(10) Patent No.: US 8,654,089 B2
(45) Date of Patent: Feb. 18, 2014

(54) TOUCH SENSING CIRCUIT AND TOUCH SENSING METHOD

(75) Inventors: Shih-Tzung Chou, Zhudong Township, Hsinchu County (TW); Zong-Lin Wu, Sanchong (TW)

(73) Assignee: Raydium Semiconductor Corporation, Hsinchu County (TW)

( * ) Notice: Subject to any disclaimer, the term of this patent is extended or adjusted under 35 U.S.C. 154(b) by 408 days.

(21) Appl. No.: 12/849,140

(22) Filed: Aug. 3, 2010

(65) Prior Publication Data

US 2011/0032210 A1 Feb. 10, 2011

(30) Foreign Application Priority Data

Aug. 6, 2009 (TW) ................................ 98126472 A

(51) Int. Cl.
*G06F 3/041* (2006.01)
*G06F 3/045* (2006.01)

(52) U.S. Cl.
USPC .......................................... 345/173; 345/174

(58) Field of Classification Search
USPC .......................................... 345/156, 173–179
See application file for complete search history.

(56) References Cited

U.S. PATENT DOCUMENTS

| 8,451,250 B2* | 5/2013 | Hsieh et al. ................... 345/174 |
| 8,525,801 B2* | 9/2013 | Huang et al. ................... 345/173 |
| 2007/0008299 A1* | 1/2007 | Hristov ......................... 345/173 |
| 2009/0284495 A1* | 11/2009 | Geaghan et al. ............... 345/174 |
| 2010/0097342 A1* | 4/2010 | Simmons et al. .............. 345/174 |
| 2010/0265199 A1* | 10/2010 | Chen .............................. 345/173 |

* cited by examiner

*Primary Examiner* — Kent Chang
*Assistant Examiner* — William Lu

(57) ABSTRACT

The invention discloses a touch sensing circuit applied to a capacitance touch panel for detecting the position of a sensed object touching the capacitance touch panel. The touch sensing circuit includes a first signal supplying module, a second signal supplying module, a first measurement module, a second measurement module and a processing module. The first signal supplying module inputs signals in turn to first sensing lines arranging along the first direction. The second signal supplying module inputs signals in turn to second sensing lines arranging along the second direction. The first measurement module and the second measurement module are used for measuring the first equivalent capacitances of the first sensing lines and that of the second sensing lines. The processing module is coupled to first measurement module and the second measurement module for determining the position of the sensed object.

4 Claims, 7 Drawing Sheets

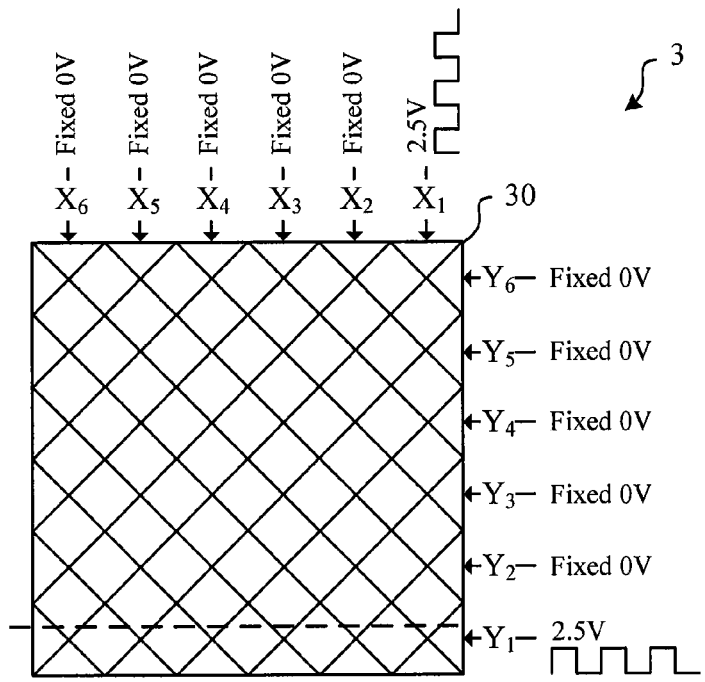
FIG. 4A1
FIG. 4A2

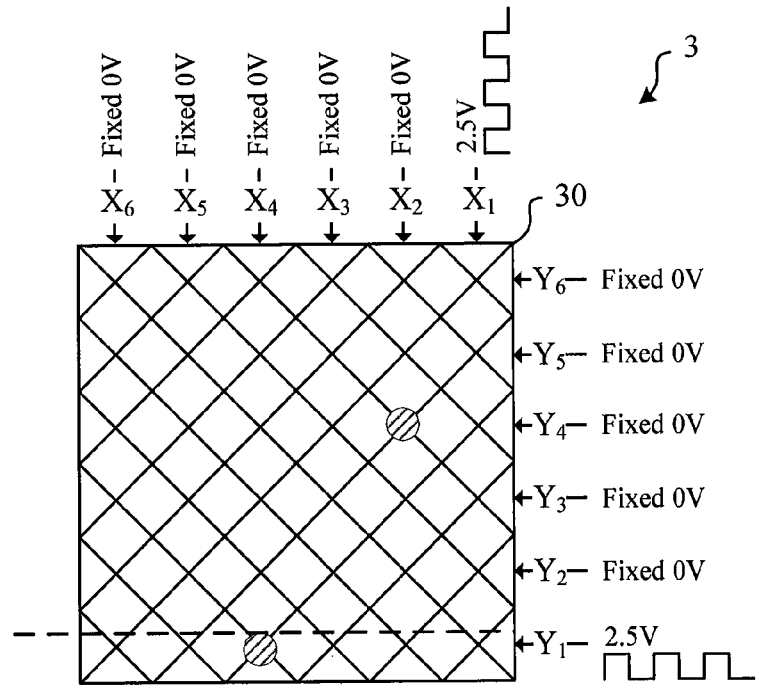
FIG. 4B1
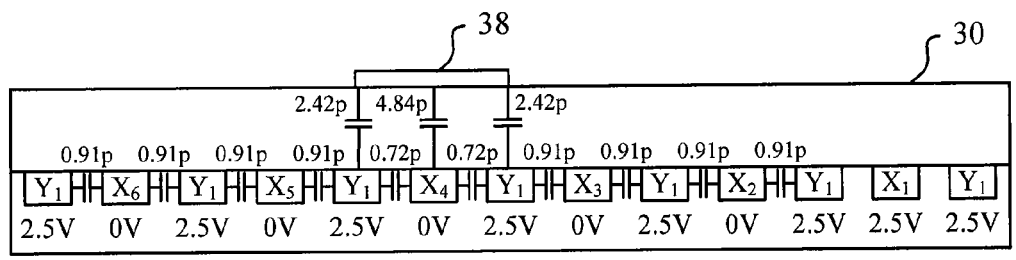
FIG. 4B2

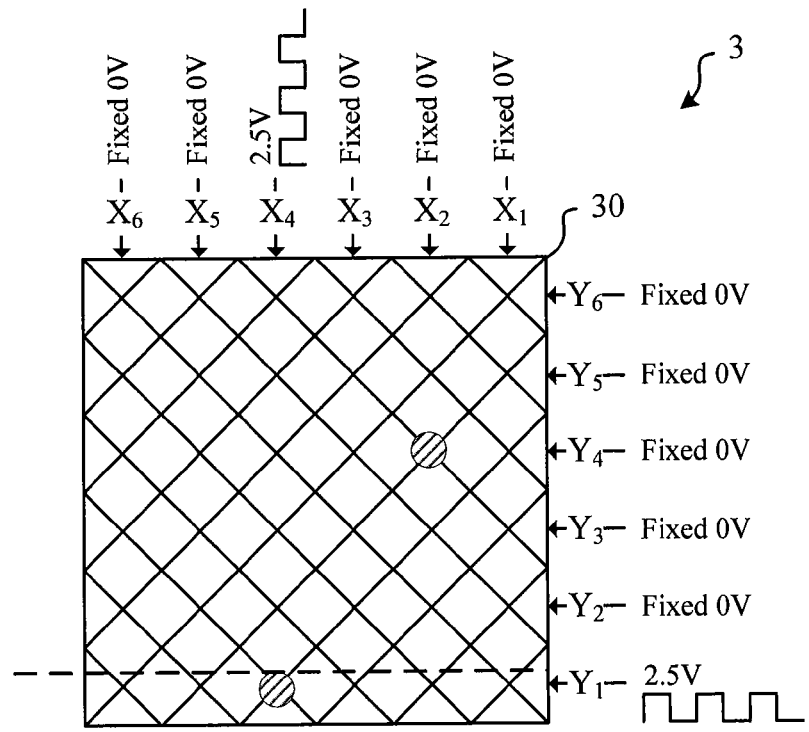
FIG. 4C1
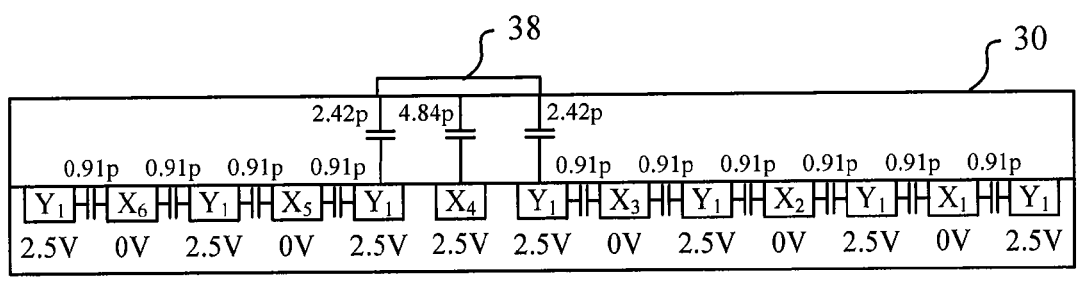
FIG. 4C2

TOUCH SENSING CIRCUIT AND TOUCH SENSING METHOD

BACKGROUND OF THE INVENTION

1. Field of the Invention

The present invention relates to a touch panel, and more particularly, to a touch sensing circuit and a touch sensing method capable of really determining multiple touch points on the capacitance touch panel by sensing the equivalent capacitances.

2. Description of the Prior Art

In general, the touch panels can be divided into different types, such as the resistance type, the capacitance type, the ultrasonic type, optical type, according to their sensing theorems. Wherein, the capacitance touch panel can sense a slight touch, and there is almost no wearing damage generated by the touch between the finger and the touch panel, so that it is stable and has long life. Therefore, compared to the conventional resistance type touch panel, Please refer to FIG. 1A and FIG. 1B. FIG. 1A and FIG. 1B show the conventional touch sensing circuit 1 and its control signal input timing diagram. As shown in FIG. 1A and FIG. 1B, the conventional touch sensing circuit will orderly input pulsed square waves from the signal input module 12 to the touch pads $X_1 \sim X_6$ and $Y_1 \sim Y_6$ on the touch panel from the X-axis direction to the Y-axis direction (or from the Y-axis direction to the X-axis direction) in a time sharing way. Then, the sensing module 14 will sense the change of the parasitic capacitance generated when the pointing object (e.g., a finger or a touch pen tip) touches the panel, and further detect the touch action of the user and the position of the touch point formed on the panel.

However, when the user performs multiple touches on the capacitance type touch panel, the above-mentioned conventional sensing circuit structure and its sensing method will only sense the range of the touch points, but fail to determine the real positions of the touch points. For example, when the user uses two fingers to touch the capacitance touch panel, the conventional sensing circuit will detect two maximum values of the parasitic capacitance changes. However, since these two maximum values can be generated through two different touch ways, the system can not precisely determine it is which one of the two ways, and these points not really touched are called "ghost points".

FIG. 2A and FIG. 2B show scheme diagrams of the conventional touch sensing circuit sensing two touch points. As shown in FIG. 2A, if the user forms two touch points A and B on the touch panel 10, the sensing circuit will detect two maximum values of the parasitic capacitance changes on the X-axis, and also detect two maximum values of the parasitic capacitance changes on the Y-axis. At this time, the touch sensing circuit fails to determine the above-mentioned parasitic capacitance changes are caused by the two touch points A and B, or the two touch points A' and B'. The touch points A' and B' shown in FIG. 2A are ghost points. Similarly, as shown in FIG. 2B, when the user forms two touch points C and D on the touch panel 10, two ghost points C' and D' will be generated.

SUMMARY OF THE INVENTION

Therefore, the invention provides a touch sensing circuit and a touch sensing method to solve the aforementioned problems.

An embodiment of the invention is a touch sensing circuit. In practical applications, the touch sensing circuit can be applied to a capacitance touch panel, for detecting a position of the capacitance touch panel touched by a pointing object. Wherein, the capacitance touch panel includes (M*N) touch points, M first touch pad sets are aligned along a first direction, and N second touch pad sets are aligned along a second direction, each first touch pad set includes at least one first touch pad, each second touch pad set includes at least one second touch pad, the first touch pads and the second touch pads are distributed at the (M*N) touch points respectively, M and N are positive integers respectively.

In this embodiment, the touch sensing circuit includes a first signal input module, a second signal input module, a first sensing module, a second sensing module, and a processing unit. The first signal input module inputs a first signal to the M first touch pad sets orderly along the first direction; the second signal input module inputs a second signal to the N second touch pad sets orderly along the second direction. The first sensing module and the second sensing module are used for sensing a first equivalent capacitance of the M first touch pad sets and a second equivalent capacitance of the N second touch pad sets respectively. The processing unit is coupled to the first sensing module and the second sensing module, and used for determining the position of the capacitance touch panel touched by the pointing object according to the first equivalent capacitance and the second equivalent capacitance.

Another embodiment of the invention is a touch sensing method. The touch sensing method is used for detecting a position of a capacitance touch panel touched by a pointing object. Wherein, the capacitance touch panel includes (M*N) touch points, M first touch pad sets are aligned along a first direction, and N second touch pad sets are aligned along a second direction, each first touch pad set includes at least one first touch pad, each second touch pad set includes at least one second touch pad, the first touch pads and the second touch pads are distributed at the (M*N) touch points respectively, M and N are positive integers respectively.

In this embodiment, the touch sensing method includes the steps of: at first, inputting a first signal to the M first touch pad sets orderly along the first direction of the capacitance touch panel, and inputting a second signal to the N second touch pad sets orderly along the second direction synchronously; then, sensing a first equivalent capacitance of the M first touch pad sets, and sensing a second equivalent capacitance of the N second touch pad sets; at last, determining the position of the capacitance touch panel touched by the pointing object according to the first equivalent capacitance and the second equivalent capacitance. Wherein, the first equivalent capacitance and the second equivalent capacitance are changed according to the position, the first signal, and the second signal.

The objective of the present invention will no doubt become obvious to those of ordinary skill in the art after reading the following detailed description of the preferred embodiment, which is illustrated in the various figures and drawings.

BRIEF DESCRIPTION OF THE APPENDED DRAWINGS

Figure 1A:
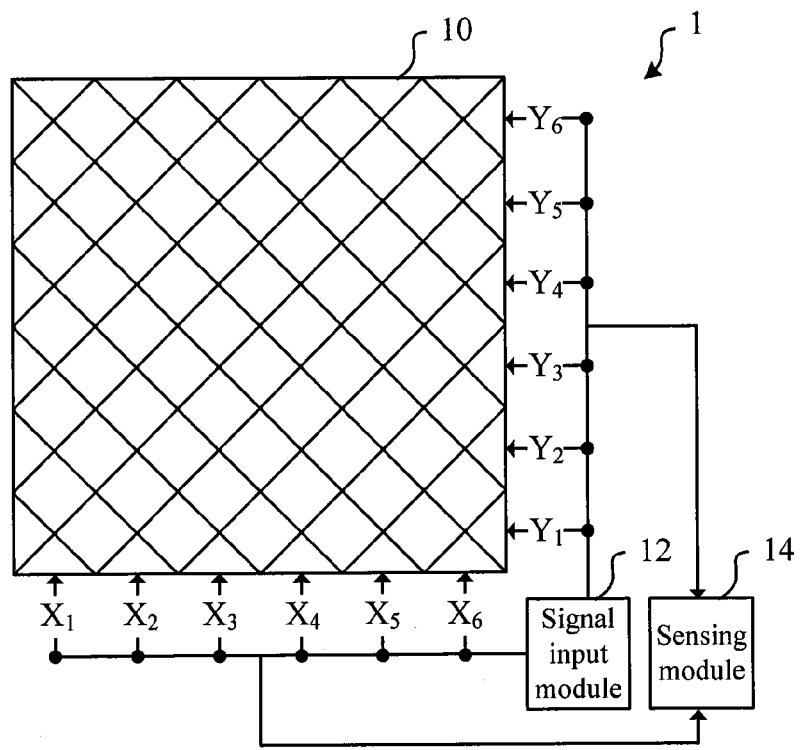
FIG. 1A illustrates a scheme diagram of the conventional capacitance type touch sensing circuit.
Figure 1B:
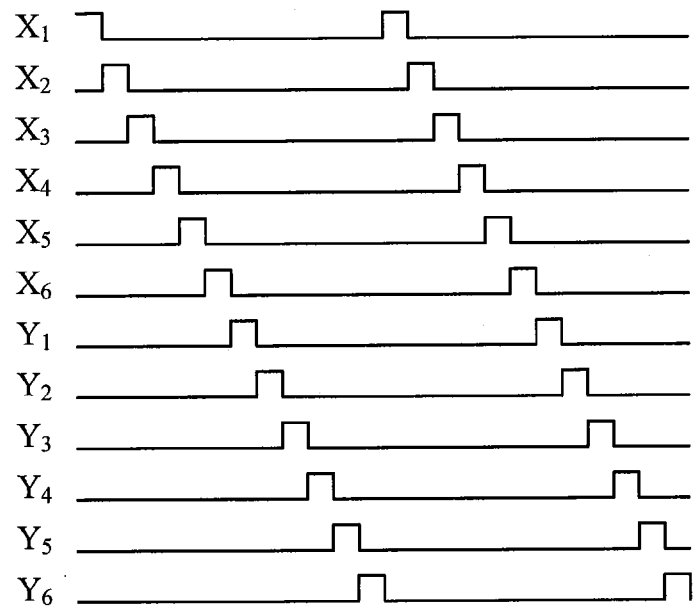
FIG. 1B illustrates the control signal input timing diagram of the conventional touch sensing circuit.
Figure 2A:
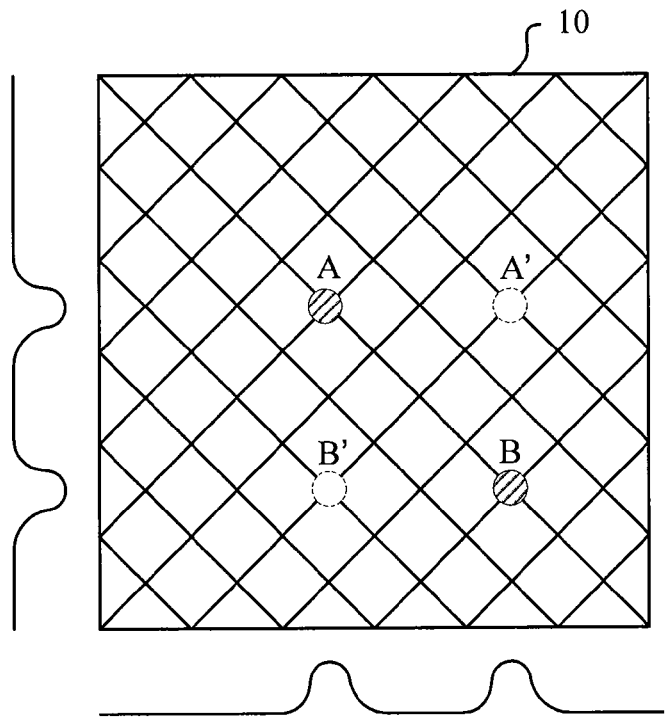
FIG. 2A and FIG. 2B illustrate scheme diagrams of the conventional touch sensing circuit sensing two touch points.
Figure 2B:
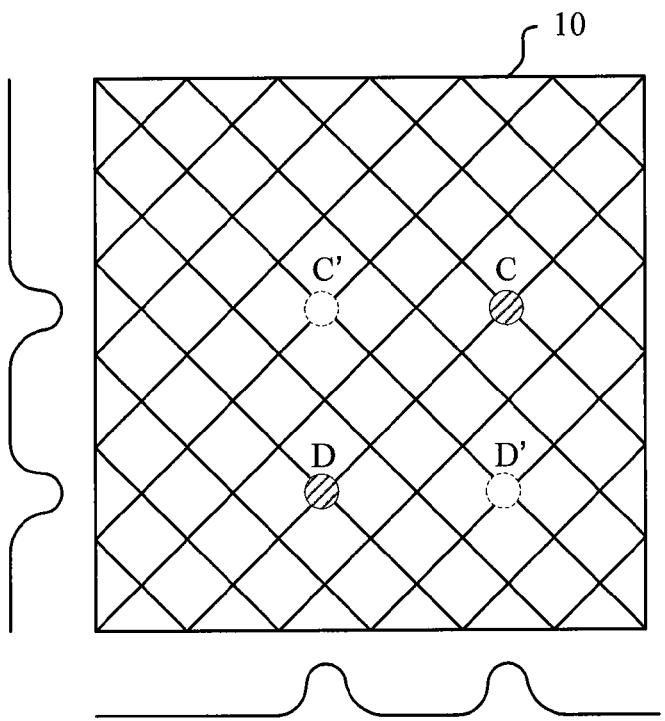
Figure 3A:
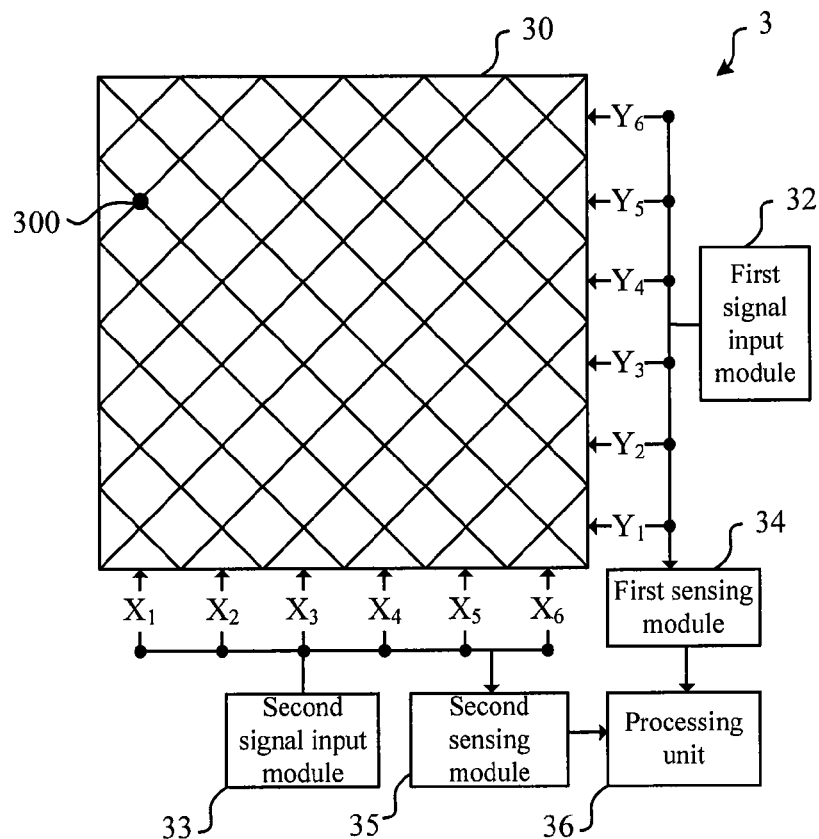
FIG. 3A illustrates a scheme diagram of the touch sensing circuit and the capacitance type touch panel in an embodiment of the invention.

FIG. 4A1 and FIG. 4A2 illustrate scheme diagrams of the input signal and equivalent capacitance when the touch sensing circuit of FIG. 3A senses no touch points.

FIG. 4B1 and FIG. 4B2 illustrate scheme diagrams of the input signal and equivalent capacitance when the touch sensing circuit in FIG. 3A is touched by the pointing object.

FIG. 4C1 and FIG. 4C2 illustrate scheme diagrams of another input signal and equivalent capacitance when the touch sensing circuit in FIG. 3A is touched by the pointing object.

Figure 5:
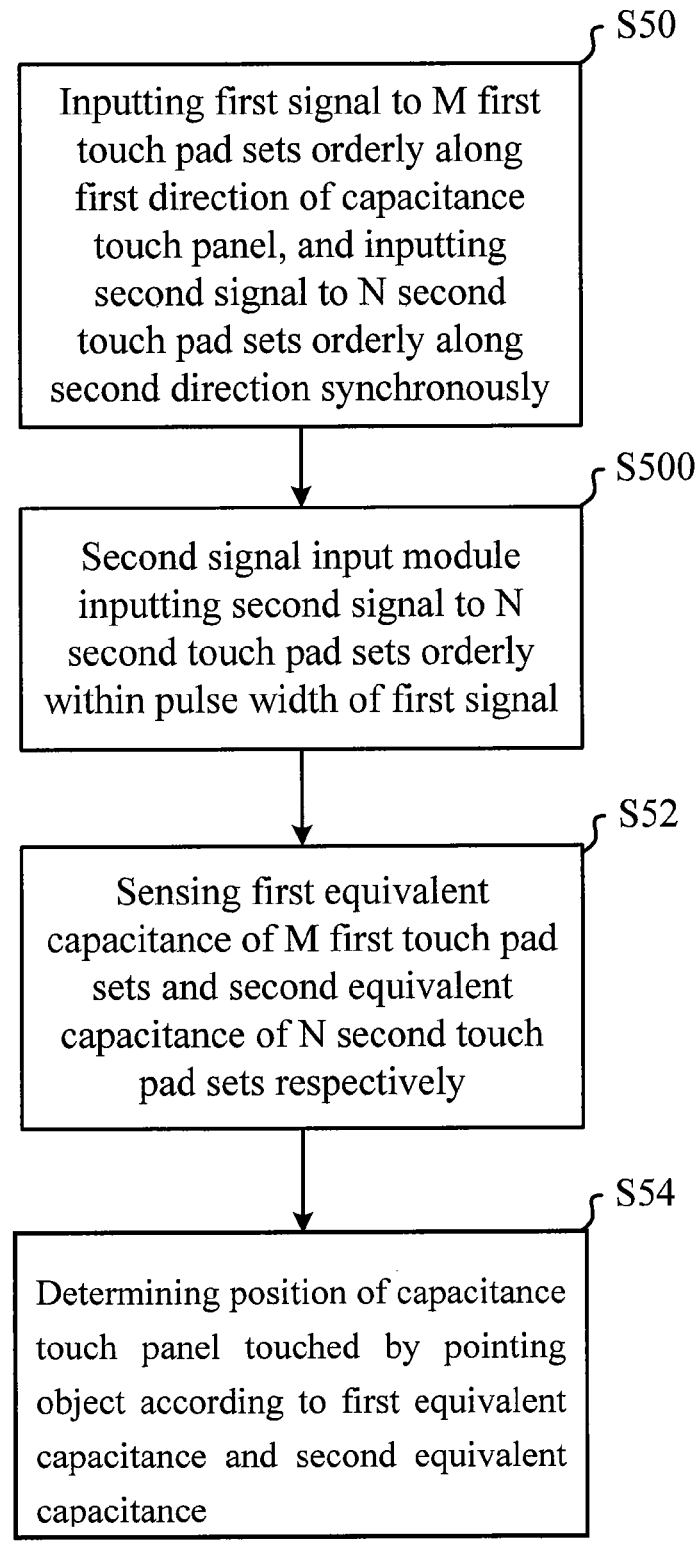

FIG. 5 illustrates a flowchart of the touch sensing method of an embodiment of the invention.

DETAILED DESCRIPTION OF THE INVENTION

The invention provides a touch sensing circuit. In practical applications, the touch sensing circuit can be applied to a capacitance touch panel, for detecting a position of the capacitance touch panel touched by a pointing object.

Please refer to FIG. 3A. FIG. 3A illustrates a scheme diagram of the touch sensing circuit 3 and the capacitance type touch panel 30 in an embodiment of the invention. As shown FIG. 3A, the capacitance type touch panel 30 includes (6*6)=36 touch points 300, 6 first touch pad sets $Y_1$~$Y_6$ and 6 second touch pad sets $X_1$~$X_6$. It should be noticed that the number of touch pad sets and touch points of the capacitance type touch panel is not limited by this case; it depends on the practical needs. Then, the structures of the capacitance type touch panel 30 and the touch sensing circuit 3 will be introduced respectively.

At first, in the capacitance type touch panel 30, the first touch pad sets $Y_1$~$Y_6$ are aligned along the Y direction, while the second touch pad sets $X_1$~$X_6$ are aligned along the X direction. In addition, the first touch pad sets $Y_1$~$Y_6$ and the second touch pad sets $X_1$~$X_6$ include at least one first touch pad and at least one second touch pad, and the first touch pads and the second touch pads are distributed on (6*6)=36 touch points 300 respectively.

The touch sensing circuit 3 includes a first signal input module 32, a second signal input module 33, a first sensing module 34, a second sensing module 35, and a processing unit 36. Wherein, the first signal input module 32 and the first sensing module 34 are coupled to the first touch pad sets $Y_1$~$Y_6$ of the capacitance type touch panel 30 respectively; the second signal input module 33 and the second sensing module 35 are coupled to the second touch pad sets $X_1$~$X_6$ respectively. It should be noticed that some touch sensing circuits can also have the function of the sensing module at the same time, that is to say, the input module and the sensing module can be practically integrated into the same module, but not limited to this case.

Figure 3B:
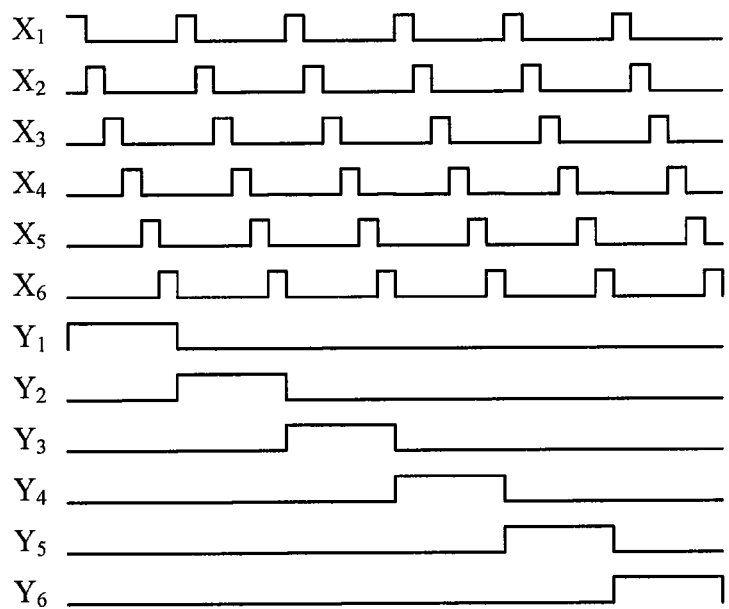
FIG. 3B illustrates the control signal input timing diagram of the touch sensing circuit in FIG. 3A.

In this embodiment, the first signal input module 32 of the touch sensing circuit 3 will orderly input a first signal to the first touch pad sets $Y_1$~$Y_6$ along the Y direction; the second signal input module 33 will orderly input a second signal to the second touch pad sets $X_1$~$X_6$ along the X direction. Please refer to FIG. 3B. FIG. 3B illustrates the control signal input timing diagram of the touch sensing circuit 3 in FIG. 3A. It should be noticed that the wave form shown in FIG. 3B represents that the first signal input module 32 and the second signal input module 33 are sensing the touch points, it is not a real sensing signal. In fact, the sensing signal relates to the touch sensing circuit. Different touch sensing circuits will have different signal wave forms. The pulsed square wave is only one of the possible signal types, not limited by this case.

In this embodiment, since the pulse width of the first signal will be six times to that of the second signal, that is to say, the inputting time of the first signal will be six times to that of the second signal. Therefore, the second signal input module 33 can orderly input the second signal to the second touch pad sets $X_1$~$X_6$ within the pulse width of the first signal respectively. For example, in the time range of the first signal input module 32 inputting the first signal to the first touch pad set $Y_1$, the second signal input module 33 can orderly input the second signal to the second touch pad sets $X_1$~$X_6$ along the X direction respectively; then, when the first signal input module 32 inputs the first signal to the first touch pad set $Y_2$, the second signal input module 33 can orderly input the second signal to the second touch pad sets $X_1$~$X_6$ along the X direction respectively; in this way, until the first signal input module 32 inputs the first signal to the first touch pad set $Y_6$, and the second signal input module 33 orderly input the second signal to the second touch pad sets $X_1$~$X_6$ along the X direction respectively.

In this embodiment, the first signal and the second signal synchronously inputted by the first signal input module 32 and the second signal input module 33 will charge and discharge the parasitic capacitance of the touch pad of the capacitance type touch panel 30. When the user uses his/her finger and indication unit to touch the capacitance type touch panel 30, the equivalent parasitic capacitance of the touch pad under the touch points will further change. Therefore, in order to control the change of the equivalent parasitic capacitance of the touch pad caused by touch, the main function of the first sensing module 34 and the second sensing module 35 of the touch sensing circuit 3 is to sense the first equivalent capacitance of the first touch pad sets $Y_1$~$Y_6$ and the second equivalent capacitance of the second touch pad sets $X_1$~$X_6$. The main function of the processing unit 36 coupled to the first sensing module 34 and the second sensing module 35 is to determine the position of the capacitance type touch panel 30 touched by the indication unit according to the first equivalent capacitance and the second equivalent capacitance.

Please refer to FIG. 4A1 and FIG. 4A2. FIG. 4A1 and FIG. 4A2 illustrate scheme diagrams of the input signal and equivalent capacitance when the touch sensing circuit of FIG. 3A senses no touch points. FIG. 4A2 illustrates a cross-sectional diagram of the touch panel 30 along the dotted line in FIG. 4A1. As shown in FIG. 4A1, if the first signal input module 32 and the second signal input module 33 input the 2.5V synchronous square wave to the first touch pad set $Y_1$ and the second touch pad set $X_1$, and 0V to other touch pad sets, then the equivalent mutual capacitances between the first touch pad set $Y_1$ and the second touch pad sets $X_1$~$X_6$ shown in FIG. 4A2 can be obtained. After simulation calculating the stored charge amount of all touch pad sets, it can be found that the total equivalent mutual capacitance is 9.1 pF.

Please refer to FIG. 4B1 and FIG. 4B2. FIG. 4B1 and FIG. 4B2 illustrate scheme diagrams of the input signal and equivalent capacitance when the touch sensing circuit in FIG. 3A is touched by the pointing object. As shown in FIG. 4B1, when the indication unit 38 touches the touch pads on ($X_4$,$Y_1$) and ($X_2$,$Y_4$), if the user wants to detect whether the touch pad on ($X_4$,$Y_1$) is touched by the indication unit 38, the first signal input module 32 and the second signal input module 33 can input the 2.5V synchronous square wave to the first touch pad set $Y_1$ and the second touch pad set $X_1$, and 0V to other touch pad sets, so that the result that the equivalent mutual capacitance between the indication unit and the first touch pad set $Y_1$ is 4.84 pF can be calculated by simulation, as shown in FIG. 4B2. However, the equivalent mutual capacitance between the touch pad sets $X_4$ and $Y_1$ will be reduced from 0.91 pF to 0.72 pF due to the reduced capacitor fringe effect because the indication unit is also 0V. Finally, it can be obtained that the total equivalent mutual capacitance is 13.56 pF.

Please refer to FIG. 4C1 and FIG. 4C2. FIG. 4C1 and FIG. 4C2 illustrate scheme diagrams of another input signal and equivalent capacitance when the touch sensing circuit in FIG. 3A is touched by the pointing object. As shown in FIG. 4C1, when the indication unit 38 touches the touch pads on $(X_4, Y_1)$ and $(X_2, Y_4)$, if the user wants to detect whether the touch pad on $(X_4, Y_1)$ is touched by the indication unit 38, the first signal input module 32 and the second signal input module 33 can input the 2.5V synchronous square wave to the first touch pad set $Y_1$ and the second touch pad set $X_4$, and 0V to other touch pad sets, so that the result that the equivalent mutual capacitance between the indication unit and the first touch pad set $Y_1$ is 4.84 pF can be also calculated by simulation, as shown in FIG. 4C2. However, because the equivalent mutual capacitance between the touch pad sets $X_1$ and $Y_1$ maintains 9.1 pF, finally, it can be obtained that the total equivalent mutual capacitance is 13.94 pF. In comparison, the total equivalent mutual capacitance obtained by the signal input way shown in FIG. 4B1 and FIG. 4B2 is 13.56 pF, but the total equivalent mutual capacitance obtained by the signal input way shown in FIG. 4C1 and FIG. 4C2 is 13.94 pF, so that 13.94 pF is the largest equivalent mutual capacitance. By doing so, it can be determined that the real touch point position is $(X_4, Y_1)$.

Another embodiment of the invention is a touch sensing method. The touch sensing method is used for detecting a position of a capacitance touch panel touched by a pointing object. Wherein, the capacitance touch panel includes (M*N) touch points, M first touch pad sets are aligned along a first direction, and N second touch pad sets are aligned along a second direction, each first touch pad set includes at least one first touch pad, each second touch pad set includes at least one second touch pad, the first touch pads and the second touch pads are distributed at the (M*N) touch points respectively, M and N are positive integers respectively.

Please refer to FIG. 5. FIG. 5 illustrates a flowchart of the touch sensing method of an embodiment of the invention. As shown in FIG. 5, the touch sensing method includes the following steps. At first, in the step S50, inputting a first signal to the M first touch pad sets orderly along the first direction of the capacitance touch panel, and inputting a second signal to the N second touch pad sets orderly along the second direction synchronously. Wherein, the first signal and the second signal are pulsed square waves respectively and inputted synchronously.

It should be noticed that the pulse width of the first signal in the step S50 is N times to the pulse width of the second signal, that is to say, the inputting time of the first signal is N times to that of the second signal. Therefore, the touch sensing method of the invention further includes the following steps. In the step S500, inputting the second signal to the N second touch pad sets orderly within the pulse width of the first signal. More specifically, in the time range of the first signal input module inputting the first signal to a certain first touch pad set along the first direction, the second signal input module can orderly input the second signal to N second touch pad sets respectively along the second direction; in the time range of the first signal input module inputting the first signal to another first touch pad set, the second signal input module can orderly input the second signal to N second touch pad sets respectively along the second direction.

Then, the step S52 is performed to sense a first equivalent capacitance of the M first touch pad sets and a second equivalent capacitance of the N second touch pad sets respectively. At last, the step S54 is performed to determine the position of the capacitance touch panel touched by the pointing object according to the first equivalent capacitance and the second equivalent capacitance. Wherein, the first equivalent capacitance and the second equivalent capacitance are changed according to the position, the first signal, and the second signal.

Above all, the touch sensing circuit of the invention inputs synchronous measurement signals along X-direction and Y-direction of the capacitance type touch panel, so that the X-direction and Y-direction equivalent capacitances corresponding to the touch pads located on the touch point positions will be different from the X-direction and Y-direction equivalent capacitances corresponding to the touch pads not located on the touch point positions. By doing so, the touch sensing circuit can effectively distinguish the real touch points and ghost points via the difference of the equivalent capacitance under the multiple touch point sensing condition, and further position the actual positions of the touch points located on the capacitance touch panel.

Although the present invention has been illustrated and described with reference to the preferred embodiment thereof, it should be understood that it is in no way limited to the details of such embodiment but is capable of numerous modifications within the scope of the appended claims.

What is claimed is:

1. A touch sensing circuit, applied to a capacitance touch panel, for detecting a position of the capacitance touch panel touched by a pointing object the capacitance touch panel comprising (M*N) touch points, M first touch pad sets aligned along a first direction, and N second touch pad sets aligned along a second direction, each first touch pad set comprising at least one first touch pad, each second touch pad set comprising at least one second touch pad, the first touch pads and the second touch pads being distributed at the (M*N) touch points respectively, M and N are positive integers respectively, the touch sensing circuit comprising:
    a first signal input module, for inputting a first signal to the M first touch pad sets orderly along the first direction;
    a second signal input module, for inputting a second signal to the N second touch pad sets orderly along the second direction;
    a first sensing module, for sensing a first equivalent capacitance of the M first touch pad sets;
    a second sensing module, for sensing a second equivalent capacitance of the N second touch pad sets; and
    a processing unit, coupled to the first sensing module and the second sensing module, for determining the position of the capacitance touch panel touched by the pointing object according to the first equivalent capacitance and the second equivalent capacitance;
    wherein the first equivalent capacitance and the second equivalent capacitance are changed according to the position, the first signal, and the second signal, and the first signal and the second signal are inputted synchronously, and a first pulse width of the first signal is N times to a second pulse width of the second signal, so that the second signal input module inputs the second signal to the N second touch pad sets orderly within the pulse width of the first signal, the processing unit obtains (M*N) total equivalent capacitances corresponding to the (M*N) touch points according to the first equivalent capacitance and the second equivalent capacitance and the processing unit determines the position of the capacitance touch panel touched by the pointing object according to the (M*N) total equivalent capacitances.

2. The touch sensing circuit of claim 1, wherein the first signal and the second signal are pulsed square waves respectively.

3. A touch sensing method, for detecting a position of a capacitance touch panel touched by an pointing object, the capacitance touch panel comprising (M*N) touch points, M first touch pad sets aligned along a first direction, and N second touch pad sets aligned along a second direction, each first touch pad set comprising at least one first touch pad, each second touch pad set comprising at least one second touch pad, the first touch pads and the second touch pads being distributed at the (M*N) touch points respectively, M and N are positive integers respectively, the method comprising the steps of:

inputting a first signal to the M first touch pad sets orderly along the first direction of the capacitance touch panel, and inputting a second signal to the N second touch pad sets orderly along the second direction synchronously;

sensing a first equivalent capacitance of the M first touch pad sets, and sensing a second equivalent capacitance of the N second touch pad sets; and determining the position of the capacitance touch panel touched by the pointing object according to the first equivalent capacitance and the second equivalent capacitance;

wherein the first equivalent capacitance and the second equivalent capacitance are changed according to the position, the first signal, and the second signal, and the first signal and the second signal are inputted synchronously, and a first pulse width of the first signal is N times to a second pulse width of the second signal, so that the second signal is inputted to the N second touch pad sets orderly within the pulse width of the first signal, (M*N) total equivalent capacitances corresponding to the (M*N) touch points are obtained according to the first equivalent capacitance and the second equivalent capacitance, and the position of the capacitance touch panel touched by the pointing object is determined according to the (M*N) total equivalent capacitances.

4. The touch sensing method of claim 3, wherein the first signal and the second signal are pulsed square waves respectively.

* * * * *